United States Patent
Sydow et al.

(10) Patent No.: US 10,667,513 B2
(45) Date of Patent: Jun. 2, 2020

(54) AGENT FOR REPELLING SNAILS AND SLUGS

(71) Applicant: Solvoluta GMBH, Kiel (DE)

(72) Inventors: Nadine Sydow, Kiel (DE); Marten Riedl, Sehestedt (DE)

(73) Assignee: Solvoluta GMBH, Kiel (DE)

( * ) Notice: Subject to any disclaimer, the term of this patent is extended or adjusted under 35 U.S.C. 154(b) by 29 days.

(21) Appl. No.: 15/774,343

(22) PCT Filed: Jul. 19, 2016

(86) PCT No.: PCT/DE2016/100326
§ 371 (c)(1),
(2) Date: May 8, 2018

(87) PCT Pub. No.: WO2017/118448
PCT Pub. Date: Jul. 13, 2017

(65) Prior Publication Data
US 2019/0021313 A1    Jan. 24, 2019

(30) Foreign Application Priority Data
Jan. 5, 2016  (DE) .................. 10 2016 100 162

(51) Int. Cl.
| | | |
|---|---|---|
| *A01N 25/30* | (2006.01) | |
| *A01N 25/00* | (2006.01) | |
| *A01N 31/02* | (2006.01) | |
| *A01N 33/12* | (2006.01) | |
| *A01N 41/04* | (2006.01) | |
| *A01N 43/16* | (2006.01) | |
| *C09D 5/00* | (2006.01) | |

(52) U.S. Cl.
CPC ............. *A01N 25/30* (2013.01); *A01N 25/00* (2013.01); *A01N 31/02* (2013.01); *A01N 33/12* (2013.01); *A01N 41/04* (2013.01); *A01N 43/16* (2013.01); *C09D 5/00* (2013.01)

(58) Field of Classification Search
None
See application file for complete search history.

(56) References Cited

U.S. PATENT DOCUMENTS

| | | |
|---|---|---|
| 6,284,286 B1 | 9/2001 | Arimoto et al. |
| 2015/0320037 A1 | 11/2015 | Wacker |
| 2016/0015028 A1 | 1/2016 | Schnabel |

FOREIGN PATENT DOCUMENTS

| | | |
|---|---|---|
| DE | 3342529 | 5/1984 |
| EP | 0259249 | 3/1988 |
| JP | S60109503 | 6/1985 |
| JP | 2014125451 | 7/2014 |
| WO | WO2016071187 | 5/2016 |

OTHER PUBLICATIONS

Pawlicki et al. "The effect of molluscan glue proteins on gel mechanics." *Journal of Experimental Biology* 207, No. 7 (2004): 1127-1135.

Tarazona et al. "Acute toxicity of synthetic detergents to snails: Effect of sodium lauryl sulfate on *Limnaea peregra* shells." *Bulletin of environmental contamination and toxicology* 39, No. 6 (1987): 1036-1040.

Tzeng et al. "Sodium dodecyl sulfate as an alternative agent for the control of golden apple snail *Pomacea canaliculata* (Lamark) in rice fields." *Proceedings of the National Science Council, ROC, Part B, Life Sciences* 18, No. 3 (1994): 138-145.

*Primary Examiner* — Alton N Pryor

(74) *Attorney, Agent, or Firm* — Diederiks & Whitelaw, PLC

(57) ABSTRACT

Agent for repelling snails and slugs, comprising an anionic, a non-ionic and an amphoteric surfactant.

17 Claims, No Drawings

AGENT FOR REPELLING SNAILS AND SLUGS

The invention relates to an agent for repelling snails and slugs.

In horticulture, snails can cause significant damage by eating, and therefore a plurality of methods are known for combating said snails, which methods are primarily directed against Spanish slugs (Arion vulgaris), red slugs (Arion rufus) and slugs belonging to the keelback slug family (Limacidae).

Although original species of slugs are considered to make use of dead plant material, in Germany, which is cool and damp, Arion vulgaris in particular has developed into the snail species most commonly known as a pest and has adapted to a fresh green environment.

It is thus noticeable that modern members of the particularly adaptable species Arion vulgaris are very resistant to dehydration. This is a property developed by selection, and is probably due to the almost exclusive use of salty scattered preparations for combating said slugs.

The disadvantage of scattered preparations, e.g., comprising methiocarb or iron(III) phosphate as the active ingredient, is that said preparations attract the slugs and contaminate the soil and the groundwater. Moreover, these generally toxic substances decimate not only snails but also their natural predators, and therefore, in some circumstances, the spread of a snail infestation may even be promoted.

It is necessary, however, for useful plants to be protected, since the evolutionary defense mechanisms (bitters, coarse leaves, prickles, or the like) of cultivated plants have mostly been eliminated through breeding in favor of other plant properties, and said plants have now become defenseless against snails.

Repelling snails purely mechanically is advantageous over chemical methods in that the environment is not polluted and the ecological function of the gastropods remains unaffected.

However, mechanical protective fences made of copper or angled overhangs provide only inadequate protection from slugs such as A. vulgaris, since said slugs can adapt, by means of an extremely sticky secretion, to structures of all kinds.

The object of the invention is therefore that of providing an effective agent for repelling snails and slugs which is non-toxic for gastropods and the use of which is ecologically harmless overall.

This object is achieved according to the invention by the agent for repelling snails and slugs according to the features of claim 1. Advantageous embodiments of the invention are found in the dependent claims.

The basic concept of the invention is that of providing an agent for modifying surfaces such that snails do not have any adhesion on the modified surfaces and do not move onto the objects or fall off the objects.

According to the invention, the agent for repelling snails and slugs comprises a combination of an anionic, a non-ionic and an amphoteric surfactant. In other words, using a combination of an anionic, a non-ionic and an amphoteric surfactant is proposed.

The adhesion of slugs on a substrate is provided in particular by the secretion given out by said slugs, it being possible for lubricating trail slime to be different from adhesive sticky slime (cf. "The effect of molluscan glue proteins on gel mechanics", Pawlicki et al., 2003, J Exp Biol 207, 1127-1135). The composition of trail slime and sticky slime consists primarily in the presence or absence of specific "adhesive proteins" which immediately oxidize and develop their adhesive effect upon contact with air.

The effect of the agent according to the invention presumably consists in that the agent reduces or destroys the function of the "adhesive proteins" by means of ionic interactions.

The agent for repelling snails and slugs preferably comprises an alkyl carboxylate, an n-alkyl sulfate, a secondary alkyl sulfate, an alkane sulfonate, a secondary alkane sulfonate or an alkylbenzenesulfonate as the anionic surfactant.

The agent for repelling snails and slugs preferably comprises a polyalkylene glycol ether, a fatty alcohol propoxylate, an alkyl glucoside, an alkyl polyglucoside, an octylphenol ethoxylate or a nonylphenol ethoxylate as the non-ionic surfactant.

The agent for repelling snails and slugs preferably comprises a betaine or a sultaine as the amphoteric surfactant.

Since the fraction of high-energy ultraviolet radiation of sunshine in the range of 290 to 400 nm can reduce the effect of the agent, it is preferable for the agent for repelling snails and slugs to have a pigment that absorbs UV light.

Particularly preferably, a pigment fraction of from 1 to 6 weight percent (based on the total mixture) is provided.

Most preferably, a fraction of 5 wt. % of pigments is provided, which pigments absorb UVA and UVB radiation.

According to the invention, a coating agent for repelling snails and slugs comprises the above-mentioned agent for repelling snails and slugs.

It has been found that surfaces having amphiphilic properties effectively prevent adaptation of the snail secretion, such that a vertical repellant coating is an obstacle that snails cannot overcome when a snail is placed on a surface of this kind.

"Amphiphilic" surfaces can be provided using the claimed agent, hydrophilic and hydrophobic regions arising in close proximity on said surfaces.

Only the combination of anionic, non-ionic and amphoteric surfactants (surfactant functional groups) is effective against all common snail and slug species in Germany, including Anion vulgaris. If individual components are omitted, individual snail species may develop evasive behavior or adhesion may be prevented for individual snail species, but adhesion prevention is only achieved by the combined surfactant charges.

Moreover, it has been found that providing a non-ionic surfactant improves the necessary consistency that is sufficient for the agent/coating agent to be developed and applied, and that providing an amphoteric surfactant improves the repellent effect of the agent/coating agent.

In particular, a weight ratio of anionic surfactant to non-ionic surfactant to amphoteric surfactant in the range of (0.2 to 2.2):(0.1 to 1.5):(0.1 to 2.2) has been found to be advantageous. Most particularly preferably, the weight ratio of the surfactants is 1:1:1.

Cationic surfactants are avoided in principle, since said surfactants have particularly long half-lives in the food chain, and are therefore considered "persistent."

In particular, the coating agent comprises a matrix that absorbs the agent for repelling snails and slugs. The fraction of surfactants in the coating agent or the coating is preferably less than 50%. Particularly preferably, the weight ratio of matrix to surfactants is between 0.7:0.3 and 0.9:0.1.

The matrix is in particular an oil or oil-based. Particularly preferably, the matrix is an oil varnish.

The oil-based matrix makes a crucial contribution to the weatherproof nature of the coating. For example, if an acrylate, silicone or an epoxide were used instead of the oil varnish, although the effect of preventing adhesion would still be achieved, said effect would be lost following any contact with water or precipitation, since the coating would be washed off.

Finally, an object having a coating comprising the agent for repelling snails and slugs and produced using the coating agent is also claimed. The object is in particular a snail fence, a snail collar, a flower bed edge, a lawn edging element, a plant tub, a compost bin or a flower pot.

The invention claimed is:

1. An agent for repelling snails and slugs, comprising a pigment that absorbs ultraviolet light in an amount of 1 to 6 weight %, an anionic surfactant, a non-ionic surfactant and an amphoteric surfactant respectively in a weight ratio of (0.2 to 2.2):(0.1 to 1.5):(0.1 to 2.2), wherein the agent repels snails and slugs while being non-toxic to gastropods.

2. The agent for repelling snails and slugs according to claim 1, wherein the anionic surfactant is selected from the group of anionic surfactants consisting of alkyl carboxylates, n-alkyl sulfates, secondary alkyl sulfates, alkane sulfonates, secondary alkane sulfonates and alkylbenzenesulfonates.

3. The agent for repelling snails and slugs according to claim 1, wherein the non-ionic surfactant is selected from the group of non-ionic surfactants consisting of polyalkylene glycol ether, fatty alcohol propoxylates, alkyl glucosides, alkyl polyglucosides, octylphenol ethoxylates and nonylphenol ethoxylates.

4. The agent for repelling snails and slugs according to claim 1, wherein the amphoteric surfactant is selected from the group of amphoteric surfactants consisting of betaines and sultaines.

5. A coating agent for repelling snails and slugs, comprising an agent configured to repel snails and slugs including an anionic surfactant, a non-ionic surfactant and an amphoteric surfactant respectively in a weight ratio of (0.2 to 2.2):(0.1 to 1.5):(0.1 to 2.2), said agent being non-toxic to gastropods, wherein the coating agent further comprises a matrix that absorbs the agent for repelling snails and slugs, the weight ratio of the matrix to surfactants is between 0.7:0.3 and 0.9:0.1 and the agent repels snails and slugs.

6. The coating agent according to claim 5, wherein the matrix is oil-based.

7. The coating agent according to claim 5, wherein the matrix is an oil varnish.

8. The coating agent according to claim 5, wherein the anionic surfactant is selected from the group of anionic surfactants consisting of alkyl carboxylates, n-alkyl sulfates, secondary alkyl sulfates, alkane sulfonates, secondary alkane sulfonates and alkylbenzenesulfonates.

9. The coating agent according to claim 5, wherein the non-ionic surfactant is selected from the group of non-ionic surfactants consisting of polyalkylene glycol ether, fatty alcohol propoxylates, alkyl glucosides, alkyl polyglucosides, octylphenol ethoxylates and nonylphenol ethoxylates.

10. The coating agent according to claim 5, wherein the amphoteric surfactant is selected from the group of amphoteric surfactants consisting of betaines and sultaines.

11. The coating agent according to claim 5, further comprising a pigment that absorbs ultraviolet light.

12. An object having a coating agent for repelling snails and slugs, the coating agent comprising an agent configured to repel snails and slugs including an anionic surfactant, a non-ionic surfactant and an amphoteric surfactant respectively in a weight ratio of (0.2 to 2.2):(0.1 to 1.5):(0.1 to 2.2), said agent being non-toxic to gastropods wherein the coating agent further comprises a matrix that absorbs the agent for repelling snails and slugs, the weight ratio of the matrix to surfactants is between 0.7:0.3 and 0.9:0.1 and the agent repels snails and slugs.

13. The object according to claim 12, wherein is a snail fence, a snail collar, a flower bed edge, a lawn edging element, a plant tub, a compost bin or a flower pot.

14. The object according to claim 12, wherein the anionic surfactant is selected from the group of anionic surfactants consisting of alkyl carboxylates, n-alkyl sulfates, secondary alkyl sulfates, alkane sulfonates, secondary alkane sulfonates and alkylbenzenesulfonates.

15. The object according to claim 12, wherein the non-ionic surfactant is selected from the group of non-ionic surfactants consisting of polyalkylene glycol ether, fatty alcohol propoxylates, alkyl glucosides, alkyl polyglucosides, octylphenol ethoxylates and nonylphenol ethoxylates.

16. The object according to claim 12, wherein the amphoteric surfactant is selected from the group of amphoteric surfactants consisting of betaines and sultaines.

17. The object according to claim 12, wherein the coating further comprises a pigment that absorbs ultraviolet light.

* * * * *